United States Patent [19]

Wildenradt

[11] 4,290,282

[45] Sep. 22, 1981

[54] SINGLE CYLINDER DEADBOLT LOCK MECHANISM

[76] Inventor: Carl H. Wildenradt, 209 Moncada Way, San Francisco, Calif. 94127

[21] Appl. No.: 68,463

[22] Filed: Aug. 21, 1979

[51] Int. Cl.³ ...................... E05B 13/00; E05B 17/04; E05B 55/06; F16D 11/06

[52] U.S. Cl. ........................................ 70/129; 70/149; 70/218; 192/71; 292/DIG. 27

[58] Field of Search ................ 70/129, 149, 218, 188, 70/231; 292/DIG. 27, 336.5; 192/71

[56] References Cited

U.S. PATENT DOCUMENTS

| | | | |
|---|---|---|---|
| 125,734 | 4/1872 | Hegner | 292/DIG. 27 |
| 269,953 | 1/1883 | Moritz | 70/218 |
| 390,704 | 10/1888 | Pursel | 70/149 |
| 1,410,829 | 3/1922 | Morgenthau | 70/149 X |
| 1,591,050 | 7/1926 | Pierce | 70/231 X |
| 1,678,174 | 7/1928 | White | 292/DIG. 27 |
| 1,994,104 | 3/1935 | Kebort | 292/DIG. 27 |
| 2,046,342 | 7/1936 | Muck et al. | 292/DIG. 27 |
| 2,123,808 | 7/1938 | Schneider | 70/149 |

FOREIGN PATENT DOCUMENTS

| | | | |
|---|---|---|---|
| 221685 | 5/1910 | Fed. Rep. of Germany | 70/149 |
| 528911 | 6/1955 | Italy | 292/DIG. 27 |
| 11061 | 5/1904 | United Kingdom | 292/DIG. 27 |

*Primary Examiner*—Roy D. Frazier
*Assistant Examiner*—Carl F. Pietruszka
*Attorney, Agent, or Firm*—Victor R. Beckman

[57] ABSTRACT

A deadbolt lock mechanism of the single cylinder type is disclosed having a latch bolt which is movable between extended and retracted positions by means of a lock cylinder at one side thereof. A thumbturn, together with manually movable coupling control means for controlling the coupling between the thumbturn and latch bolt are located at the other side of the mechanism. In the bolt retracted position, the coupling control means is movable between coupling enabling and disabling positions to condition the coupling for operation of the latch bolt by the thumbturn in the enabling position thereof, and for disabling such latch bolt operation by the thumbturn in the disabling position. Consequently, the latch bolt is operable by the lock cylinder in any position of the thumbturn and coupling control means, whereas the thumbturn is enabled for operation of the latch bolt only when the coupling control means has been moved into enabling position.

2 Claims, 9 Drawing Figures

SINGLE CYLINDER DEADBOLT LOCK MECHANISM

BACKGROUND OF THE INVENTION

Single cylinder deadbolt lock mechanisms having a thumbturn at the side opposite the cylinder lock are well known. Conventional locks of this type provide for extending and retracting the latch bolt by use of either the lock cylinder or the thumbturn. A recognized disadvantage of such lock mechanisms is that a burglar or other such unauthorized person who gains entry to a building may easily exit the same through the door after simply unlocking the same from the inside by use of the thumbturn. For doors with windows, entry to the building is readily gained after first breaking the window and unlocking the door from the inside thereof. Although double cylinder deadbolt locks often are used to prevent such easy exit from a building, they are more expensive than single cylinder locks and, in case of fire or other emergency, may prevent quick egress from the building.

Additionally, single cylinder deadbolt lock mechanisms are known wherein the thumbturn is rendered inoperative when the latch bolt is moved into locking position by key operation of the lock cylinder. Such a lock mechanism is shown in U.S. Pat. No. 2,178,666 issued to O. C. Larson. As with the above-mentioned prior art single cylinder locks of this general type, a major disadvantage of such an arrangement is that the door can not be opened from the inside using the thumbturn after being locked by use of the key from the outside. Any authorized person in the building could not exit through the door once the door is locked by operation of the lock cylinder. An arrangement which avoids this disadvantage is shown in U.S. Pat. No. 4,047,408 issued to Eddie D. Johns, et al. wherein the thumbturn is selectively rendered inoperable when the cylinder lock is operated by the key. With this arrangement, if the key is depressed while locking the door, the thumbturn is rendered inoperative and, if not depressed, the thumbturn remains operative. Major disadvantages of such an arrangement include the complexity and cost of manufacturing the same which greatly limit the marketability thereof. Also, the thumbturn disabling mechanism is operated from the cylinder side of the lock rather than from the thumbturn side thereof as in the mechanism of the present invention, contributing to the complexity of the prior art mechanisms.

SUMMARY OF THE INVENTION AND OBJECTS

An object of this invention is the provision of an improved single cylinder deadbolt lock mechanism with a thumbturn which avoids the above-mentioned and other shortcomings and disadvantages of prior art single and double cylinder lock mechanisms.

An object of this invention is the provision of an improved single cylinder deadbolt lock mechanism with thumbturn which is of extremely simple design, which may incorporate many standard lock components, and which costs very little more to manufacture than conventional single cylinder deadbolt lock mechanisms with thumbturn which is always enabled.

An object of this invention is the provision of means whereby conventional single cylinder deadbolt lock mechanisms may be readily converted to locks with a thumbturn which is rendered operative or inoperative for actuation of the latchbolt by means of coupling control means located at the thumbturn side of the mechanism.

The above and other objects and advantages of this invention are achieved by use of a latch bolt movable between extended and retracted positions by use of spindle bar means connected thereto through a rotatable crank. A lock cylinder with a rotatable plug, located at one side of the lock mechanism, is coupled through a lost-motion connection to the spindle bar means for key operation of the latch bolt between retracted and extended positions. A thumbturn at the opposite side of the lock mechanism is releasably coupled to the spindle bar means through releasable coupling means including a detent. Manually movable detent control means, selectively operable from the opposite side of the lock mechanism, controls the detent for operation of the releasable coupling means between thumbturn coupled and uncoupled conditions.

BRIEF DESCRIPTION OF THE DRAWINGS

The invention, together with other objects and advantages thereof will be better understood from the following description considered with the accompanying drawings. In the drawings, wherein like reference characters refer to the same parts in the several views.

Figures 1, 2, 3, 4:
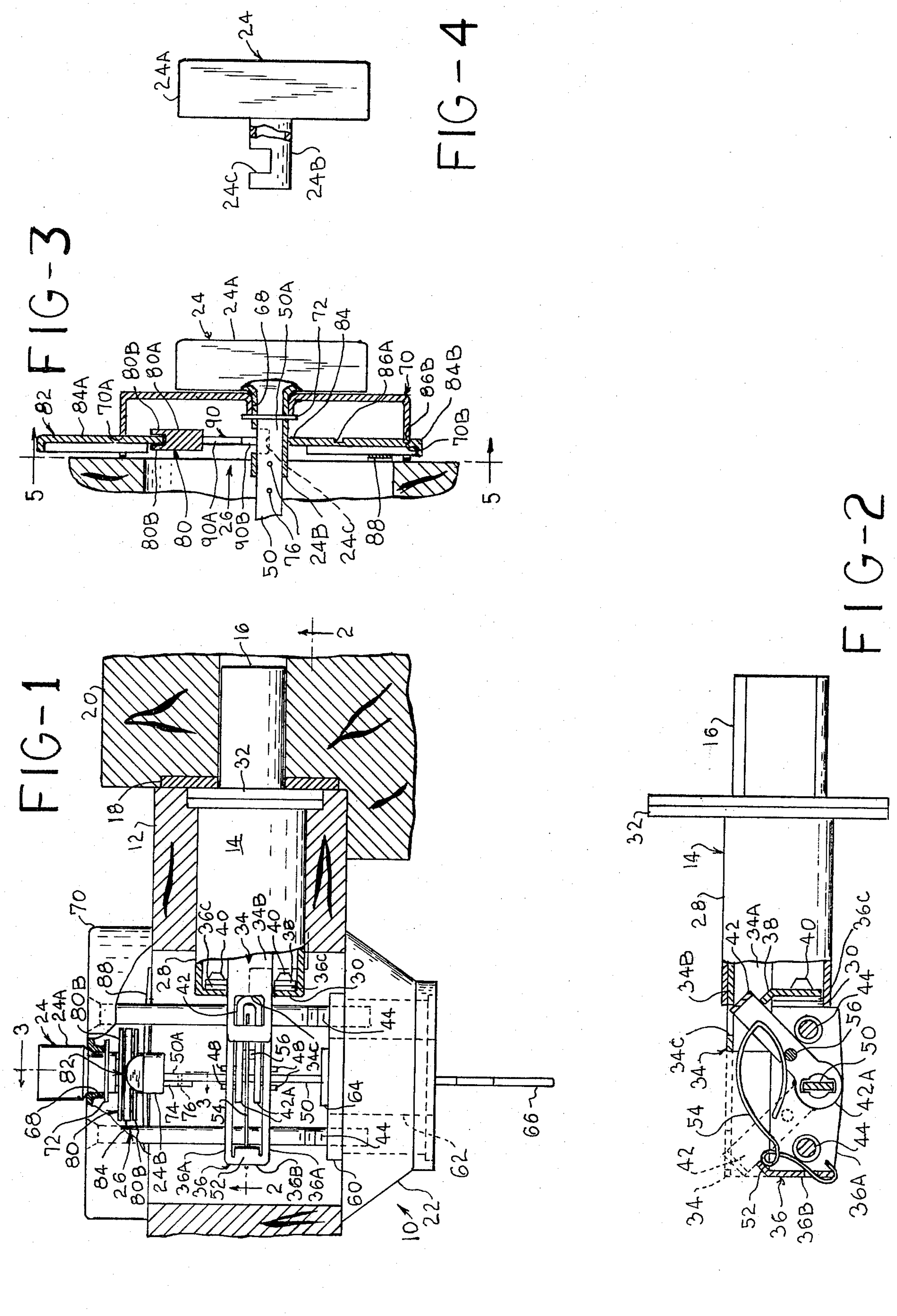
FIG. 1 is a horizontal sectional view through a door and lock mechanism which embodies the present invention and showing the latch bolt of the lock mechanism in extended locking position by operation of a cylinder lock, parts of the latch unit being shown broken away for clarity.
FIG. 2 is a fragmentary sectional view of the lock mechanism taken substantially along line 2—2 of FIG. 1.
FIG. 3 is a fragmentary sectional view of the releasable coupling means taken substantially along lines 3—3 of FIG. 1.
FIG. 4 is an elevational view of the thumbturn employed in the lock mechanism of the present invention, with a portion thereof being shown broken away for clarity.

Reference first is made to FIG. 1 of the drawings wherein the novel lock mechanism 10 of this invention is shown installed on a door 12. The lock mechanism 10 includes a latch unit 14, which may be of conventional design, and which includes a latch bolt 16 movable into and out of engagement with an aperture in a strike plate 18 at the door jamb 20 by operation of a cylinder lock 22 at the outer face of the door or a thumbturn 24 at the inner face thereof. The thumbturn 24 is coupled to the latch bolt 16 through novel releasable coupling means 26 described in detail hereinbelow. Before describing the novel releasable coupling means, the substantially conventional latch unit 14 and cylinder lock 22 will be described.

The latch unit 14 includes a cylindrical shaped housing 28 formed at the inner end with an end wall 30 having an elongated, generally rectangular shaped aperture formed therein. A face-plate 32 at the outer end of the housing 28 is formed with an aperture in the shape of the latch bolt cross-section into which the latch bolt extends for slidable support thereat. Screws, not shown, secure the face plate 32 to the edge of the door 12 at a mortice formed therein.

A latch bar 34 is fixedly secured, by means not shown, to the latch bolt 16, and extends rearwardly thereof through the aperture in the housing end wall 30. The rearwardly extending portion of the illustrated latch bar 34 is in the form of a channel member having a generally inverted U-shaped cross-section and including spaced vertical wall members 34A, 34A (only one of which is seen in FIG. 2) and an interconnecting upper wall 34B. A camming aperture 34C is formed in the connecting wall 34B adjacent the rear of the latch bar for use in actuating the latch bar and attached latch bolt 16 between extended and retracted positions in a manner described below.

A latch bar supporting member 36 is fixedly attached to the rear, or inner, wall 30 of the housing 28 and extends rearwardly thereof. The supporting member 36 is formed with spaced vertical side walls 36A, 36A which underlie the latch bar walls 34A, 34A for slidable support of the latch bar 34 on said supporting member 36. An end wall 36B joins the side walls 36A, 36A at the inner, or rear, end thereof. The forward end of the supporting member 36 extends through the aperture in the end wall 30 of the housing 28, and sidewardly extending mounting flanges 36C, 36C are formed thereat for use in attachment of the supporting member 36 to the housing 28. A stop member 38 also is located at the forward end of the supporting member 36, and the mounting flanges 36C, 36C are sandwiched between the housing end wall 30 and stop member 38. Means, such as staking 40,40 at the housing 28 secure the supporting and stop members 36 and 38, respectively, to the housing end wall 30. The stop member 38 includes a central section at the aperture in the end wall 30 which serves to limit pivotal movement, in one rotary direction, of a crank, or actuating lever, 42 rotatably mounted on the supporting means 36.

The side walls of the supporting means 36 are formed with clearance holes adjacent opposite ends thereof through which mounting screws 44, 44 extend. Also, central, axially aligned, openings are formed in the side walls 36A, 36A for the rotatable support of the crank 42. The illustrated crank comprises a U-shaped member which includes a pair of parallel arms joined at one end and formed with hubs 42A, 42A at the opposite free arm ends. The hubs 42A, 42A have central portions which are bent outwardly to form pairs of prongs 48,48 which extend through the central apertures in the walls 36A, 36A of the supporting member 36 for rotatable support of the crank 42 about the aperture axes. Spindle bar means 50 extend through the spaces between the prongs 48,48 for non-rotatably coupling the same to the crank 42.

The crank 42 engages the camming aperture 34C formed in the latch bar 34 for actuation of the attached latch bolt 16 between retracted and extended positions upon rotation of the crank 42 by spindle bar means 50. Rotation of the crank 42 in the bolt-extending position is limited by engagement thereof with the stop member 38. A stop member 52 formed at the upper edge of the rear wall 36B of the support member 36 limits rotation of the crank 42 in the opposite, bolt-retracted, direction. Spring means 54 attached to the rear wall 36B engages a pin 56 extending between the parallel arms of the crank 42 to provide a snap-over action for resiliently biasing the crank in either rotary direction, depending upon which side of "dead-center" position the crank is located. Such snap-over means maintains the crank 42 in either rotary end position, and prevents rotation thereof except through positive drive rotation by the spindle bar means 50.

The cylinder lock 22 which, as mentioned above, also may be of conventional design, includes a housing 60 containing a tumbler cylinder 62 in which a cylinder plug 64 is rotatably mounted through use of a key 66. A lost-motion connection, not shown, of conventional design, connects the cylinder plug 64 to spindle bar means 50 for drive rotation thereof. As is well understood, the lost-motion connection allows for return rotation of the key 66 to a position allowing for removal of the key from the cylinder plug without corresponding rotation of the spindle bar means following key locking and unlocking operations. With the key 66 inserted in the cylinder lock 22, the spindle bar means 50 and attached crank 42 may be rotated in a clockwise direction, as viewed in FIG. 2, during which rotation the crank 42 drives the latch bar 34 and attached latch bolt 16 into extended, locking, position shown in FIGS. 1 and 2. Rotation of the crank 42 in a counterclockwise direction by spindle bar 50 returns the latch bar 34 and attached latch bolt 16 to retracted, unlocked, position shown in broken lines in FIG. 2. With the present arrangement, the latch bolt 16 is movable between retracted and extended positions by means of the cylinder lock 22 for both locking and unlocking operations regardless of the operating position of the thumbturn 24 and associated releasable coupling means 26 for coupling the thumbturn to spindle bar means 50.

The novel releasable coupling means 26 for releasably coupling the thumbturn 24 to spindle bar means 50 now will be described. The thumbturn 24, as seen in FIGS. 1, 3 and 4, includes a knob 24A with an integral cylindrical tubular shaft 24B which extends through an axially-flanged aperture 68 formed in an interior escutcheon plate 70 for rotatable support of the thumbturn on the escutcheon plate. Axial movement of the thumbturn relative to the escutcheon plate is prevented by the knob 24A at the outer side of the escutcheon plate and a locking ring 72 on the shaft 24B at the inner side thereof. It here will be noted that the mounting screws 44, 44, which are of the nonremovable type, extend through apertures in the escutcheon plate 70, and threadedly engage tapped holes formed in the cylinder lock housing 60 for holding the escutcheon plate 70 and cylinder lock 22 in position on the door 12.

As best seen in FIG. 3, the inner end of spindle bar means 50 extends into the tubular shaft 24B of the thumbturn 24, and is relatively rotatable therewith in the released, or uncoupled, condition of the releasable coupling means 26. The spindle bar means 50, at least at the inner end thereof, preferably has a generally semi-cylindrical cross-sectional shape to facilitate such relative rotary movement. Where the conventional lock includes a flat spindle bar, of the type illustrated, a generally semi-cylindrical-shaped member 74 may be attached to the inner end thereof as by use of pins 76, 76 extending into aligned holes in the spindle bar means 50 and member 74, in friction tight engagement therewith. In any case, a flat 50A is formed at the inner end of the spindle bar means 50, and extends past a semi-cylindrical groove, or cut-out portion, 24C formed in the side of the thumbturn shaft 24B. The groove 24C is adapted to receive positive detent means 80 for releasably coupling the thumbturn shaft 24B to spindle bar means 50 at the groove. Manually operated coupling control means 82 at the interior of the door 12 selectively controls the detent means 80 for such coupling, and non-coupling, engagement.

The coupling control means 82 is in the form of an apertured plate 84 having opposite, upwardly and downwardly extending, arms 84A and 84B extending therefrom. As best seen in FIG. 3, the arms 84A and 84B extend through diametrically opposite apertures 70A and 70B formed in the escutcheon plate 70 to provide for selective up and down manual movement of the plate 84 of the coupling control means 82. As will become apparent, in the lowered position of the plate 84, shown in FIGS. 8 and 9, the thumbturn 24 and spindle bar means 50 are relatively non-rotatably coupled through detent means 80 whereby the thumbturn 24 is rendered operative for locking and unlocking operations. In the raised position of the plate 84, shown in FIGS. 1, 3, 5, 6 and 7, detent means 80 is released, or disengaged, from the thumbturn 24 and spindle bar means 50, thereby rendering the thumbturn 24 inoperative for movement of the latch bolt 16.

The plate 84 is releasably locked in the above-described raised and lowered positions to prevent inadvertent and undesired movement thereof between the raised, uncoupling and lowered, coupling, positions thereof. As seen in FIG. 3, the one plate arm 84B is formed with notches 86A and 86B engagable by an edge of the escutcheon plate aperture 70B through which the arm 84B extends. A leaf spring 88 attached to the escutcheon plate 70 resiliently urges the arm 84B outwardly for positive locking engagement of an arm notch with the escutcheon plate. In FIG. 3, the edge of the aperture 70B in the escutcheon plate and the notch 86B are shown interengaged to lock the plate 84 in the raised position. The plate 84 is released for sliding movement simply by first pressing inwardly on the arm 84B.

The illustrated detent means 80 comprises a semi-cylindrical shaped disc portion 80A extending through an aperture, or slot, 90 in the plate 84. Radially extending flanges 80B, 80B are provided at opposite ends of the detent means 80 which flanges straddle the plate 84 adjacent the aperture 90 for mounting the detent means 80 on the plate 84 within said aperture. In the illustrated arrangement the aperture 90 is elongated, extending in the direction of the plate actuating arms 84A and 84B. It is of generally keyhole shape; being formed with an enlarged diameter end portion 90A within which the detent means 80 is rotatably mounted. The enlarged diameter end 90A of the aperture, and cooperating semi-cylindrical shaped disc portion 80A of the detent means 80, preferably exceed twice the width of the slot 90 at the small end thereof so as to prevent relative sliding movement of the detent means along the slot; the detent means being limited to rotary movement within the large diameter end section 90A of the slot 90.

The coaxial thumbturn shaft 24B, at the groove 24C therein, and spindle bar means 50 also extend through the slot 90. As noted above, in the raised position of plate 84 (FIGS. 1, 3, 5, 6 and 7) detent means 80 is disengaged from said thumbturn shaft 24B and spindle bar means 50. In this released position the spindle bar means 50 and thumbturn 24 are independently, relatively, rotatable whereby the lock mechanism 10 can only be operated by operation of the cylinder lock. In FIGS. 1, 2, 3 and 5 the spindle bar means 50 is shown in locked, latch bolt extended, condition, having been placed in such locked condition by key operation of the cylinder lock 22. Rotation of the thumbturn 24 at the inside of the door is possible, but with the detent 80 in the released condition such rotation is not transmitted to the spindle bar means.

Figure 9:
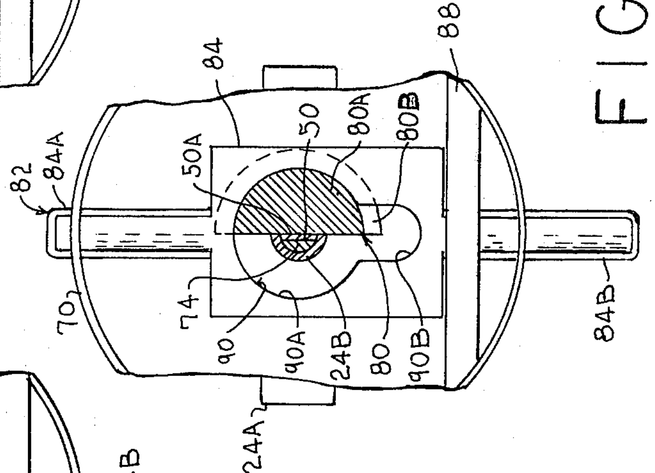
FIG. 9 is an enlarged fragmentary cross-sectional view which is similar to that of FIG. 8 but showing the spindle bar means rotated by either the lock cylinder or thumbturn for extension of the latch bolt into extended position.
Figure 6:
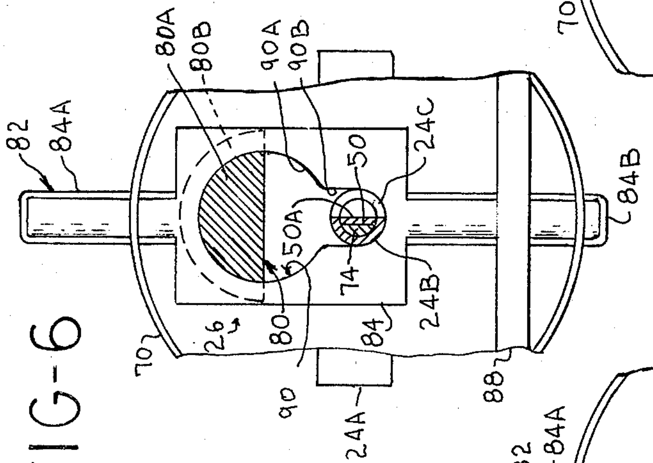
FIG. 6 is an enlarged fragmentary cross-sectional view which is similar to that of FIG. 5 but showing inoperability of the thumbturn to retract the latch bolt in the illustrated detent released position of the coupling control means.
Figure 8:
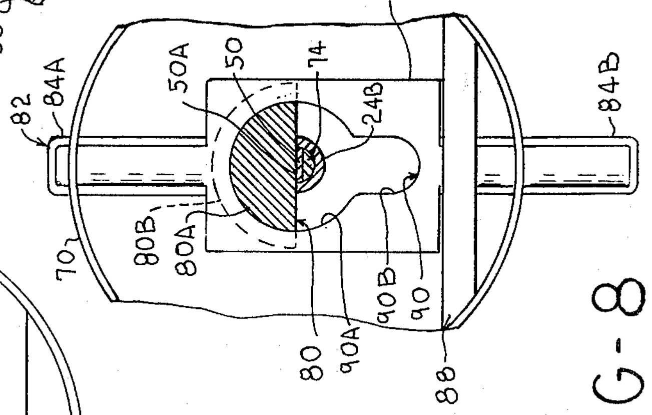
FIG. 8 is an enlarged fragmentary cross-sectional view which is similar to that of FIG. 7 but showing the coupling control means in detent coupling position to provide for coupling engagement between the thumbturn and spindle bar means.

The thumbturn 24 is coupled to the spindle bar means 50 by manually moving the apertured plate 84 downwardly into its lowered position shown in FIGS. 8 and 9. In this position the thumbturn 24 and spindle bar means are coupled through detent means 80 such that rotation of one results in rotation of the other. Now, actuation of the latch bolt 16 by rotation of the thumbturn 24 is possible to provide for locking and unlocking operations from inside the door, as in the manner of conventional single cylinder deadbolt lock mechanisms with thumbturn.

Although the operation of the novel lock mechanism is believed to be apparent from the above description, a brief description thereof now will be given. With the selectively operable coupling control means 82 manually moved into the raised, thumbturn disengaged, position shown in FIGS. 1, 3, 5, 6 and 7, detent means 80 is free of the spindle bar means 50 and thumbturn shaft 24B. The lock mechanism 10 is shown in locked, latch bolt extended, condition in FIGS. 1, 2, 3 and 5 of the drawings, having been placed in such locked condition by key operation of the cylinder lock 22. In these Figs. detent means 80 is shown moved upwardly out of engagement with the spindle bar means 50 and thumbturn shaft 24B. Consequently, rotation of the thumbturn 24 from, say, the FIG. 5 to the FIG. 6 position, results in no rotation of the spindle bar means 50. With the thumbturn so disabled exit through the door is prevented.

Figure 7:
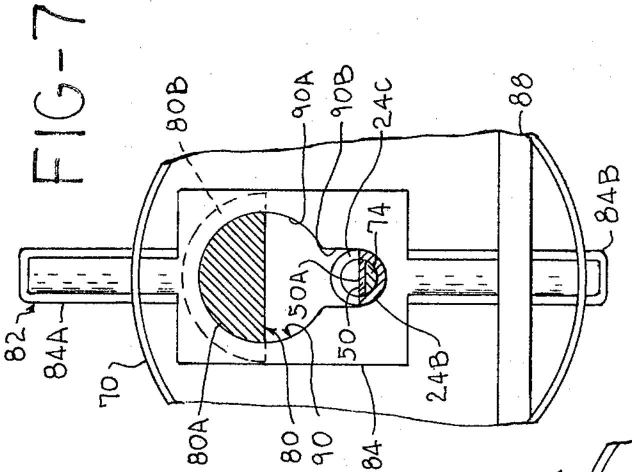
FIG. 7 is an enlarged view which is similar to that of FIG. 5 but showing the spindle bar means rotated 90° into door-unlocked condition.
Figure 5:
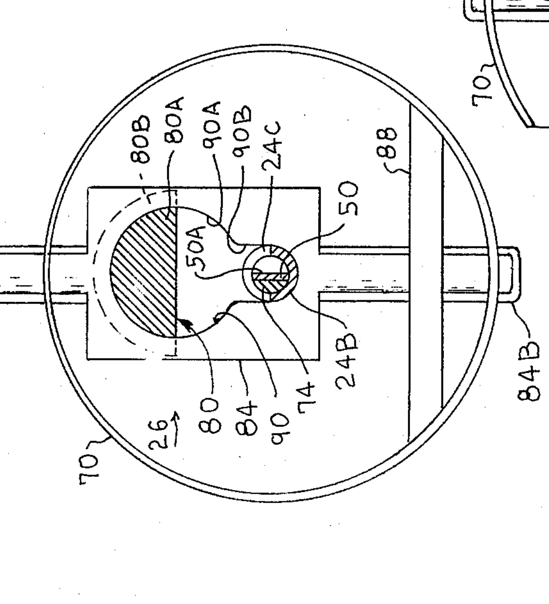
FIG. 5 is an enlarged cross-sectional view of the releasable coupling means taken substantially along line 5—5 of FIG. 3.

In FIG. 7, spindle bar means 50 is shown rotated counterclockwise from the FIG. 5 position for retraction of the latch bolt 16; the lock mechanism being shown unlocked in the broken line position of FIG. 2. From the door unlocked condition shown in FIG. 7, the door may be closed and locked from the outside by rotation of spindle bar means 50 clockwise 90° into the FIG. 5 position by operation of the cylinder lock 22 through use of the key 66. When so locked, coupling means 26 is rendered inoperative for unlocking the door by operation of thumbturn 24. If thumbturn 24 is rotated in an attempt to open the door from the inside, the thumbturn shaft 24B simply rotates relative to the spindle bar means 50. Thus, thumbturn 24 is rendered inoperative for locking and unlocking operations from inside the door.

With both the thumbturn 24 and spindle bar means 50 rotated into the door unlocked condition shown in FIG.

7, the coupling control means 82 may be moved downwardly into the position illustrated in FIGS. 8 and 9, whereby the lock mechanism is made to function in the manner of more conventional locks of this general type. The coupling control means 82 is released for downward movement by first pushing inwardly on the lower arm 84B thereof to remove the notch 86B from engagement with the lip of the hole 70B, at which time it is slidable downwardly into position for engagement with the notch 86A. With the coupling control means in the lowered position, illustrated in FIGS. 8 and 9, detent means 80 engages flat 50A on spindle bar means 50 and the thumbturn shaft 24B at the notch 24C therein. Now, the thumbturn 24 and spindle bar means 50 are coupled through said detent means 80 for simultaneous rotation of one upon rotation of the other. That is, the detent means 80, spindle bar means 50 and thumbturn 24 rotate as a unit upon rotation of either the thumbturn or spindle bar means. Consequently, spindle bar means 50 is rotatable between bolt retracted position (FIG. 8) and bolt extended position (FIG. 9) by operation of either the cylinder lock 22 or thumbturn 24. It will be seen, then, that with the coupling control means 82 in the lowered position, thumbturn 24 is coupled to spindle bar means 50 thereby rendering the thumbturn operative for operation of the lock mechanism between locked and unlocked conditions.

The invention having been described in detail in accordance with the requirements of the Patent Statutes, various changes and modifications will suggest themselves to those skilled in this art. For example, spindle bar means 50 may be provided with an integral, generally semi-cylindrical-shaped portion at the inner end thereof, without use of a separate member 74 attached thereto. Also, spindle bar means 50 may comprise separate axially aligned sections, with one section extending between the cylinder lock 22 and crank 42, and another section extending between the crank 42 and thumbturn 24. Additionally, latch units 14 and cylinder locks 22 of different design may be employed in the mechanism; the invention residing primarily in the releasable coupling means for the thumbturn and not in the illustrated latch unit and cylinder lock. It is intended that the above and other such changes and modifications shall fall within the spirit and scope of the invention as defined in the appended claims.

I claim:

1. A lock mechanism comprising, a lock cylinder at one side thereof, a thumbturn at the opposite side thereof, a latch bolt operated by rotation of said cylinder, releasably engagable means for interconnecting said thumbturn and latch bolt, means selectively operable from said opposite side of the lock mechanism movable between thumbturn enabling and disabling positions for conditioning said releasably engagable means for non-coupling relationship between said thumbturn and latch bolt in the thumbturn disabling position thereof, said releasably engagable means including, a tubular shaft on said thumbturn formed with a slot in one side thereof, spindle bar means coupled to said latch bolt and having an end portion with a flat thereon coaxially aligned with said thumbturn shaft and extending past said slot therein, and detent means maintained by said selectively operable means in said shaft slot in non-relatively movable engagement with both said thumbturn shaft and flat on said spindle bar means for nonrotatably connecting said thumbturn shaft and spindle bar means in the thumbturn enabling position of said selectively operable means.

2. A lock mechanism as defined in claim 1 wherein said selectively operable means comprises a manually movable plate formed with an elongated aperture through which said detent means, spindle bar means and thumbturn shaft extend, and said detent means comprises a generally semi-cylindrical-shaped member formed with radially extending flanges for straddling said movable plate at the elongated aperture formed thereon, said detent means and plate being relatively rotatably movable.

* * * * *